US00RE33822E

United States Patent [19]

Coughran, Jr.

[11] E Patent Number: Re. 33,822

[45] Reissued Date of Patent: Feb. 18, 1992

[54] HINGE-TYPE OFFSET WHEEL HARROW

[75] Inventor: Samuel J. Coughran, Jr., Cedartown, Ga.

[73] Assignee: Rome Industries, Inc., Cedartown, Ga.

[21] Appl. No.: 567,900

[22] Filed: Jan. 3, 1984

Related U.S. Patent Documents

Reissue of:

[64] Patent No.: 4,308,919
Issued: Jan. 5, 1982
Appl. No.: 109,551
Filed: Jan. 4, 1980

[51] Int. Cl.[5] ..... A01B 21/08; A01B 63/22; A01B 73/06

[52] U.S. Cl. ..... 172/240; 172/327; 172/396; 172/581; 172/680

[58] Field of Search ..... 172/240, 315, 316, 324, 172/326, 327, 328, 396, 413, 421, 579, 580, 581, 583, 584, 587, 596, 597, 677, 679, 680; 280/43.23, 411 C

[56] References Cited

U.S. PATENT DOCUMENTS

| | | | |
|---|---|---|---|
| 2,114,549 | 4/1938 | Taylor | 172/596 X |
| 2,728,179 | 12/1955 | Oehler et al. | 172/240 |
| 3,271,042 | 9/1966 | Flodin | 280/43.23 |
| 3,439,750 | 4/1969 | McKay | 172/581 |
| 3,461,972 | 8/1969 | McKay | 172/240 |
| 3,643,743 | 2/1972 | Fueslein | 172/320 |
| 3,672,701 | 6/1972 | Blank | 280/43.23 X |
| 3,912,017 | 10/1975 | Rehn | 172/328 |
| 3,912,018 | 10/1975 | Brundage et al. | 172/580 X |

FOREIGN PATENT DOCUMENTS

| | | | |
|---|---|---|---|
| 1387055 | 12/1964 | France | 172/583 |

*Primary Examiner*—Richard T. Stouffer
*Attorney, Agent, or Firm*—Hurt, Richardson, Garner, Todd & Cadenhead

[57] ABSTRACT

Two gang disc harrow units are pivotally joined near corresponding ends by a vertical axis hinge coupling. Near their opposite corresponding ends, the harrow units are connected by a collapsible toggle linkage which operates in a horizontal plane under influence of a power cylinder, whereby the harrow units can be positioned at a prescribed angle for working the soil and in parallel relationship for transport. Two transport wheels are pivotally attached to the rear harrow unit on transverse pivot axes which are parallel to the rear unit. Power cylinders interconnecting these wheels with the rear harrow unit are operable to lower and raise the wheels for lifting and lowering the rear unit. The front harrow unit has a pivotal connection with a drawbar which in turn is coupled through a draft tongue with the hitch of a towing or transport vehicle. Another power cylinder connected between the pivoted drawbar and front harrow unit is operable to lift and lower the front unit.

5 Claims, 4 Drawing Sheets

HINGE-TYPE OFFSET WHEEL HARROW

Matter enclosed in heavy brackets [ ] appears in the original patent but forms no part of this reissue specification; matter printed in italics indicates the additions made by reissue.

BACKGROUND OF THE INVENTION

The present invention has for its objective to provide a simpler and more efficient harrow of the type which includes two pivotally connected gang disc units and attendant adjusting means. More particularly, it is an object of the invention to simplify the means for adjusting the operative angle between the leading and trailing pivoted harrow units and for shifting them into parallel locked relationship for transport.

Another object and feature of the invention is to provide an improved, simplified and more efficient arrangement for shifting the harrow bodily between its transport and soil working positions in relation to a towing vehicle, such as a farm tractor.

In this latter connection, the rear harrow unit is equipped with a pair of transport wheels having power means to raise and lower them relative to the rear unit. The front harrow unit is equipped with a pivoted drawbar and associated power means to swing the drawbar on a transverse horizontal pivot axis relative to the front unit. When the drawbar is depressed, a draft tongue carried by it bears down on the hitch of the towing vehicle and the resulting reaction raises the front harrow unit. Two fluid circuits are involved, one for the raising and lowering of the harrow and one for adjusting the angle between the front and rear harrow assemblies or units.

Other features and advantages of the invention will become apparent during the course of the following description.

DETAILED DESCRIPTION

Figure 1:
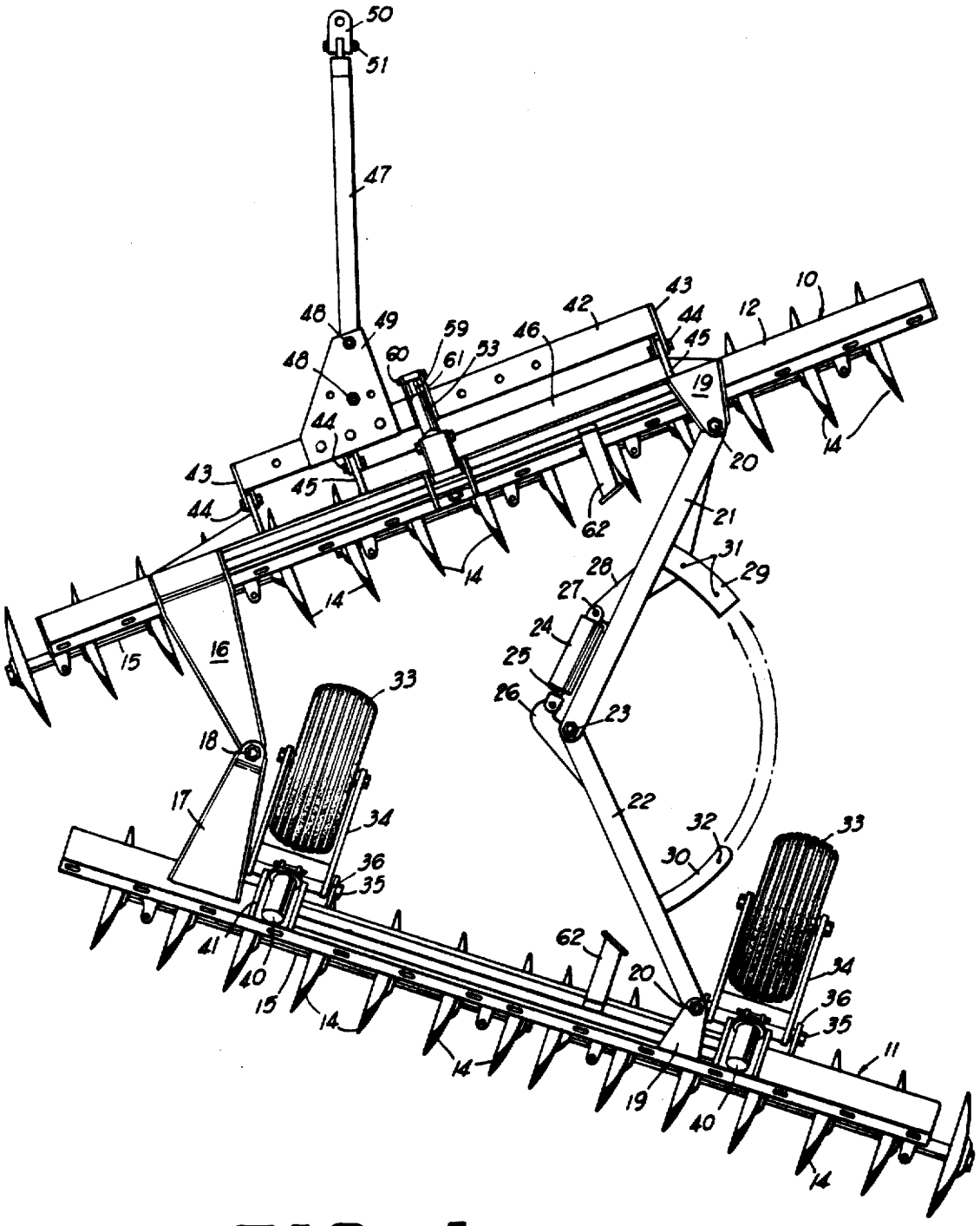
FIG. 1 is a plan view of a harrow embodying the present invention in its soil-working mode.

Referring to the drawings in detail wherein like numerals designate like parts, a hinge type harrow comprises leading and trailing harrow units 10 and 11 each having a main elongated frame member 12, such as a rectangular cross section tube member of suitable length. Attached dependingly to each member 12 through conventional support arm means 13 are gangs of harrow discs 14 or other harrow-type soil workers, such as harrow teeth. The gange of discs 14 are mounted on common support shafts 15 carried by the arm means 13. In general, the disc harrow units 10 and 11 per se are conventional and need not be described in greater detail. The essence of the present invention now to be described resides in means to manipulate the units 10 and 11 in certain modes.

The frame members 12 of the two disc harrow units are pivotally coupled in spaced relationship near corresponding ends thereof. More particularly, horizontal coupling arms 16 and 17 on the respective members 12 project rearwardly and forwardly and are pivotally joined by a single vertical axis coupling or pivot pin 18. This allows the two harrow units 10 and 11 to swing in a horizontal plane relative to each other between variable angle soil-working positions, FIG. 1, and spaced parallel transport positions, FIG. 2.

Near their other corresponding ends, the two frame members 12 mount fixed brackets 19 carrying vertical axis pivot elements 20 coupled with forward and rear toggle arms or links 21 and 22 which in turn are pivotally connected at 23 by another pivot element or pin. In the operation of the harrow, the toggle arms 21 and 22 can assume the wide or obtuse angular relationship shown in FIG. 1 or the narrow acute angular relationship shown in FIG. 2. The toggle arms never reach a dead center or near-dead-center relationship with the pivot elements 20. The two toggle arms 21 and 22 are driven between their relative positions in FIGS. 1 and 2 by a hydraulic cylinder 24 having its piston rod 25 pivotally coupled to an integral extension 26 of toggle link 22 and having its cylinder end similarly coupled at 27 to an extension 28 rigid with the link 21.

Figure 2:
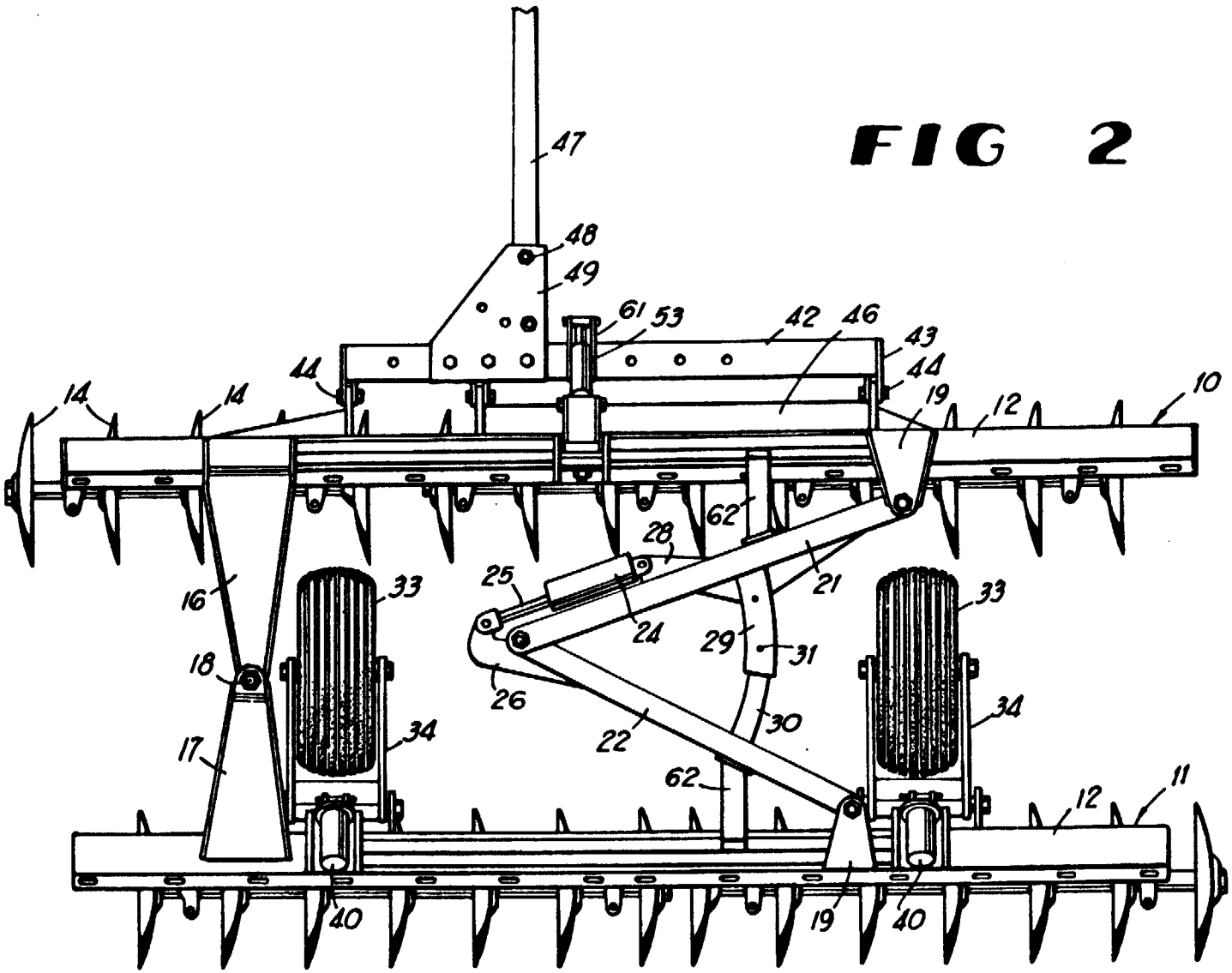
FIG. 2 is a plan view of the harrow in its transport mode.

An arcuate locking sleeve 29 on the link 21 near its longitudinal center can receive an arcuate locking tongue 30 on the link 22 telescopically, FIG. 2, so that the two harrow units 10 and 11 can be rigidly locked in the parallel transport position by dropping a suitable locking pin through one of the openings 31, adapted to register with an opening 32, FIG. 1, of the tongue 30.

Figure 6:
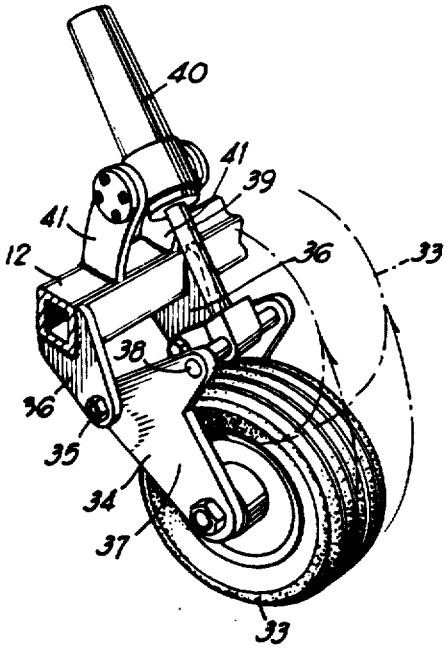
FIG. 6 is a fragmentary perspective view of one pivoted transport wheel and associated power cylinder.

Mounted in spaced parallel relationship to the rear frame member 12 at right angles thereto and projecting forwardly thereof are a pair of transport wheels 33, each journaled on a bell crank yoke 34 pivotally attached at 35 to rigid depending bracket arms 36 on the rear frame member 12, as best shown in FIG. 6. The extensions 37 of bell crank yokes 34 are pivotally coupled at 38 to piston rods 39 of a pair of hydraulic cylinders 40 which rise from upright supports 41 on rear frame member 12 to which they are rigidly attached. The cylinders 40 are swiveled and vertically swingable in relation to their supports 41, as best shown in FIG. 6. The two cylinders 40 are operated in unison by conventional controls, not shown, in one hydraulic circuit, separate from another circuit which includes controls for the power cylinder 24 of the described toggle linkage.

Figure 7:
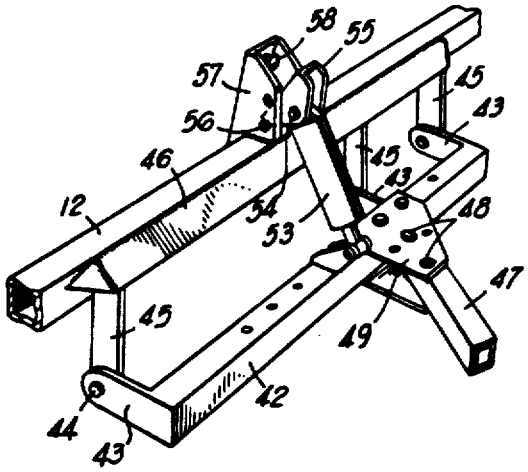
FIG. 7 is a fragmentary perspective view of a drawbar and associated components.

A drawbar 42 for the harrow composed of the two units 10 and 11 is positioned forwardly of and below the forward frame member 12, as shown in the drawings. This drawbar has opposite end rearward extensions 43, FIG. 7, pivotally coupled at 44 to the bottoms of rigid vertical arms 45 dependingly secured to a welded projection 46 on the forward face of adjacent frame member 12. As most clearly shown in FIGS. 1 and 2, three coaxial pivot points 44 for the drawbar 42 on the forward frame member 12 and its projection 46 are provided for added sturdiness.

A draft tongue 47 is coupled as at 48 to a tongue bracket 49 laterally adjustably mounted on the drawbar 42, usually in offset relationship to the center of the front harrow unit 10, as shown. As mounted, the tongue 47 is rigid with respect to the drawbar 42. At its forward end, the tongue carries a pivoted coupling 50 which may swing vertically on a pivot element 51. The coupling 50 is adapted for connection to the hitch pin 52 of a tractor or the like employed to tow the harrow.

A single inclined power cylinder 53 is provided near the center of the front harrow unit 10 and has its upper cylinder end pivotally attached at 54 to a rocker bracket 55 which in turn is pivoted at 56 to another U-shaped bracket 57 rigid with the member 12 and extending thereabove. An adjustable stop element 58 for the rocker bracket 55 is provided near the top of fixed bracket 57 to positively limit the rearward swing of rocker bracket 55 under the influence of power cylinder 53. The rod 59 of cylinder 53 is pivotally connected at 60 between a pair of rigid plates 61 which rise from the drawbar 42.

Figure 3:
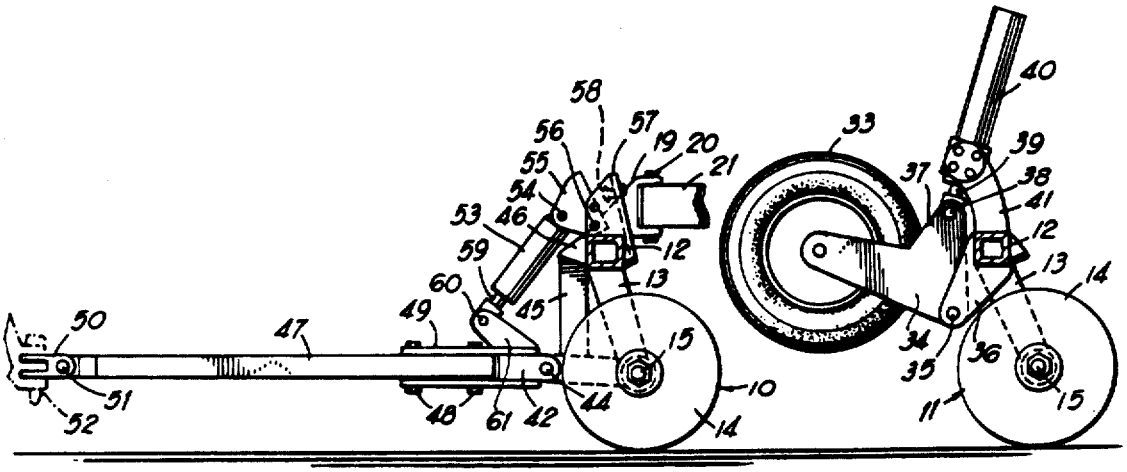
FIG. 3 is a fragmentary side elevation of the harrow, partly in section, in the soil-working mode.

When the harrow is being used in the soil treating mode, FIGS. 1 and 3, the rods of the two cylinders 40 are retracted to elevate transport wheels 33 to their positions shown in FIG. 3, and the discs 14 of rear harrow unit 11 are on the ground.

Similarly, the rod of forward cylinder 53 is retracted and through the rigid plates 61 the drawbar 42 is in a level position and rocker bracket 55 is spaced from the stop element 58. This renders the pivoted drawbar 42 and the tongue 47 free floating relative to the hitch 52 of the towing vehicle and the cylinder 53 is now a rigid link in the system. The discs 14 of the front harrow unit 10 are also on the ground.

The desired angular relationship between the front and rear units 10 and 11 can be achieved through a wide range of adjustment by retracting the rod 25 of power cylinder 24 the necessary amount to open the toggle links 21 and 22 to the extent necessary. FIG. 1 shows the maximum angle between the forward and rear disc units.

To condition the harrow for transport, the rod 25 of cylinder 24 is fully extended as in FIG. 2 to close the toggle links 21 and 22 and render the two units 10 and 11 parallel. As previously described, the machine can be locked for safety in the transport position by placing a locking pin through the engaged elements 29 and 30. Additionally, a pair of rigid stops 62 for the links 21 and 22 in the transport position are preferably provided. The stops 62 are fixed on the forward and rear units 10 and 11 and extend in opposite directions to abut the links 21 and 22 solidly when the frame members 12 are parallel and the rod 25 is extended. The stops 62 thus stabilize the machine during transport.

Figure 4:
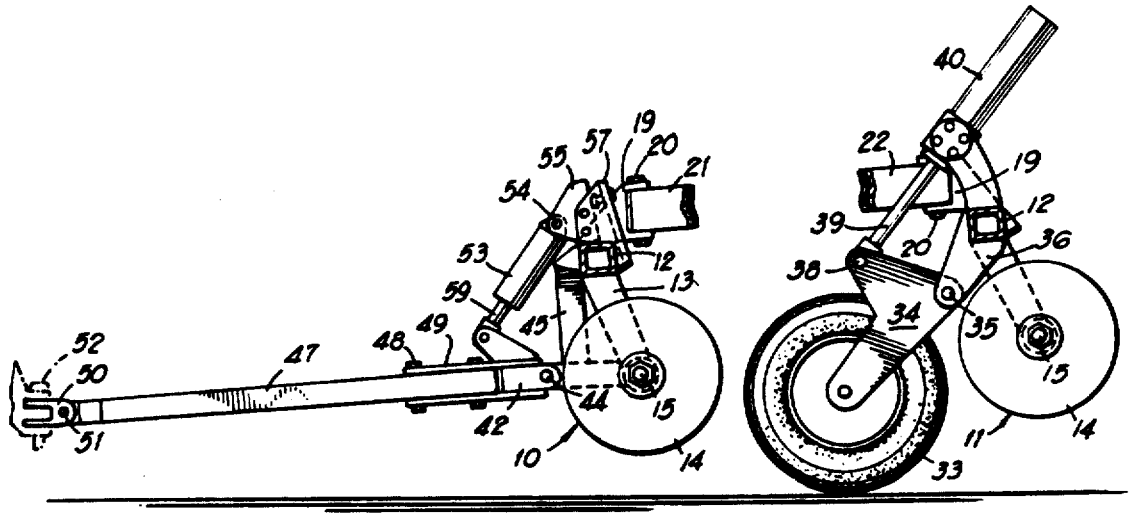
FIG. 4 is a similar view showing the harrow in an intermediate elevated position.
Figure 5:
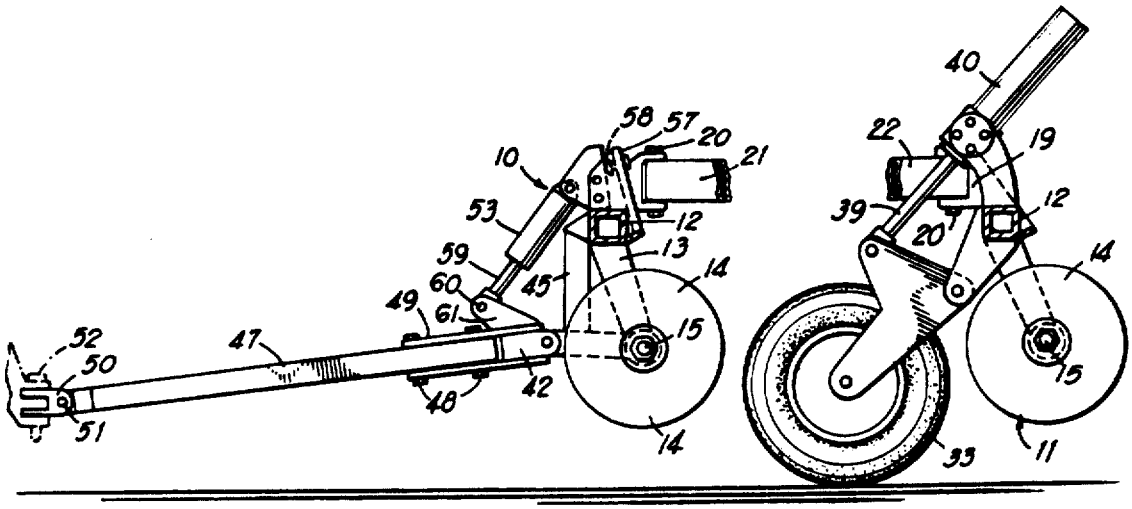
FIG. 5 is a similar view of the harrow in the completely elevated transport position.

Following this, the two transport wheel cylinders 40 have their rods extended, as shown in FIG. 4, and the wheels 33 descend and engage the ground and elevate the rear unit 11 including the discs 14 from the ground, as shown. The rod 59 of front cylinder 53 is extended and as this occurs rocker bracket 55 swings into contact with the stop 58, FIG. 4. Simultaneously, the drawbar 42 and connected tongue 47 are depressed below the horizontal and the reaction of the hitch 52 on the tongue causes the raising of the front harrow unit 10, as shown in FIG. 4. At this point, the frame of the machine defined by members 12 and links 21 and 22 is not quite level. However, final and full extension of the rod 59, as shown in FIG. 5, and the resulting further depression of drawbar 42 and tongue 47 against the hitch of the towing vehicle completes the elevation of the forward unit 10 at which point the members 12 and toggle links 21 and 22 are substantially level, FIG. 5.

The entire mechanism is simple, positive in operation, reliable and comparatively inexpensive to manufacture compared to prior art machines. It is believed that the advantages of the invention over the prior art will be apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A harrow comprising leading and trailing harrow units, means pivotally coupling said units near corresponding ends thereof for relative angular adjustment, a toggle linkage interconnecting said units near the other ends of the units, power means connected with the toggle linkage to open and close it for adjusting the angle between said units and for drawing said units into substantially parallel relationship for transport, spaced transport wheels on the trailing unit substantially at right angles thereto and being pivotally attached to the trailing unit for vertical swinging movement for raising and lowering the trailing unit relative to the ground, power means connected with the transport wheels to swing them on their pivots, a drawbar and tongue assembly pivotally coupled with said leading unit for vertical swinging relative thereto, said [tongue] *drawbar and tongue assembly* adapted for coupling with a hitch of a towing vehicle for the harrow, power means on the leading unit coupled with said drawbar and tongue assembly to raise and lower the assembly on its pivot[, thereby] *for* lowering and raising the leading unit relative to the ground through the reactive force of said hitch [on said tongue] *when coupled to said drawbar and tongue assembly*, said power means on the leading unit comprising a single hydraulic cylinder having one end coupled to said drawbar and tongue assembly and its other end coupled to a rocker element which in turn is pivotally attached to said leading unit, and an adjustable stop element for the rocker element on said leading unit in the path of rocking movement of the rocker element.

2. A harrow as defined in claim 1, and interengageable adjustably lockable side extensions on said toggle linkage enabling the toggle linkage to be rigidly locked in a folded condition when said leading and trailing harrow units are substantially parallel.

3. A harrow as defined in claim 2, and said side extensions comprising arcuate extensions adapted to telescope.

4. A harrow as defined in claim 3, and a pair of rigid stops fixed on said leading and trailing harrow units between the ends of said units and projecting rearwardly and forwardly respectively and adapted to engage said toggle linkage when the latter is folded and locked to stabilize the harrow in a transport mode.

*5. A harrow comprising leading and trailing harrow units, means pivotally coupling said units near corresponding ends thereof for relative angular adjustment, a toggle linkage interconnecting said units near the other ends of the units, power means connected with the toggle linkage to open and close it for adjusting the angle between said units and for drawing said units into substantially parallel relationship for transport, spaced transport wheels on the trailing unit substantially at right angles thereto and being*

*pivotally attached to the trailing unit for vertical swinging movement for raising and lowering the trailing unit relative to the ground, power means connected with the transport wheels to swing them on their pivots, a drawbar and tongue assembly pivotally coupled with said leading unit for vertical swinging relative thereto, said drawbar and tongue assembly adapted for coupling with a hitch of a towing vehicle for the harrow, power means on the leading unit coupled with said drawbar and tongue assembly to raise and lower the assembly on its pivot for lowering and raising the leading unit relative to the ground through the reactive force of said hitch when coupled to said drawbar and tongue assembly, said power means on the leading unit comprising an assembly having a hydraulic cylinder pivotally coupled to a rocker element, said assembly being pivotally attached at one end to said drawbar and tongue assembly and at the opposite end to said leading unit, and an adjustable stop element positioned in the path of rocking movement of said rocker element so as to selectively limit the swing of said rocker element under the influence of said hydraulic cylinder.*

* * * * *